No. 695,304. Patented Mar. 11, 1902.
L. B. GRAY.
LOCK NUT.
(Application filed Oct. 12, 1901.)
(No Model.)
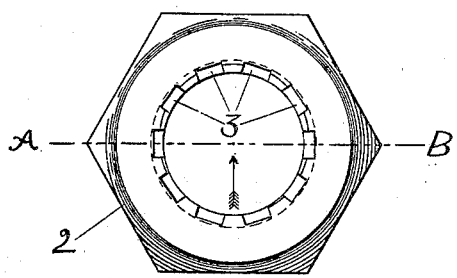
Fig. 3.
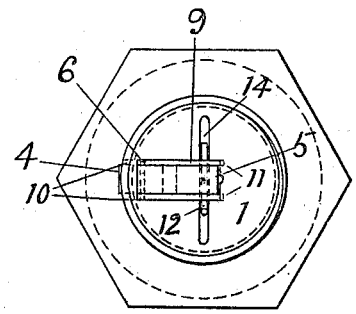
Fig. 4.
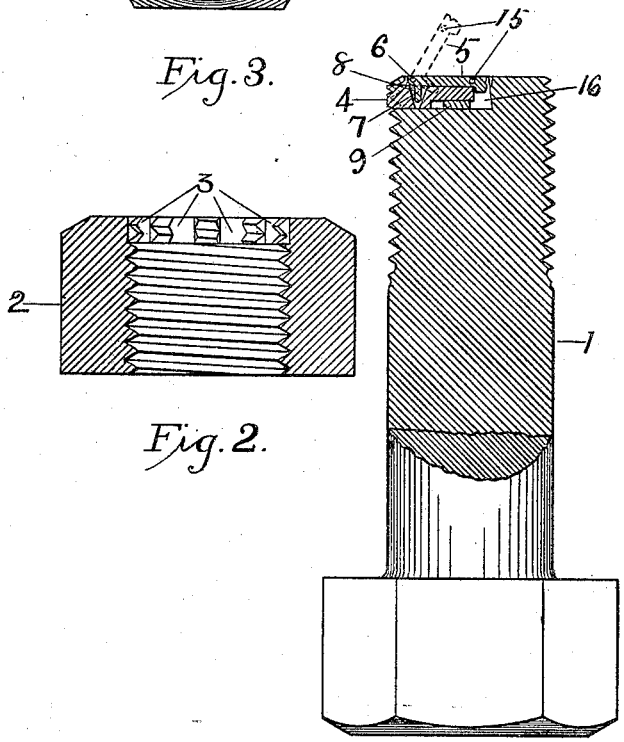
Fig. 2.
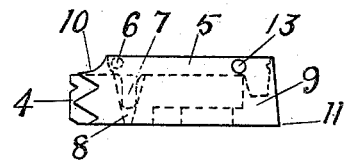
Fig. 5.
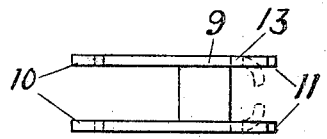
Fig. 6.
Fig. 1.
Witnesses.
S. Gordon Hopkins.
Arthur J. Minor.
Lawrence Battle Gray, Inventor.
Per
William W. Varney, Attorney.
THE NORRIS PETERS CO., PHOTO-LITHO., WASHINGTON, D. C.

UNITED STATES PATENT OFFICE.

LAWRENCE BATTLE GRAY, OF STUDLEY, VIRGINIA.

LOCK-NUT.

SPECIFICATION forming part of Letters Patent No. 695,304, dated March 11, 1902.

Application filed October 12, 1901. Serial No. 78,446. (No model.)

*To all whom it may concern:*

Be it known that I, LAWRENCE BATTLE GRAY, a citizen of the United States, residing at Studley, in the county of Hanover and State of Virginia, have invented a new and useful Lock-Nut, of which the following is a specification.

My invention relates to improvements in lock-nuts; and the object of my improvement is the positive locking of the nut at any desirable point on the bolt within certain necessary but adequate limits. I attain this object by the mechanism illustrated in the accompanying drawings, in which—

Figure 1 is a view of the bolt with the nut removed, showing the threaded end of the same in section, thereby showing to best advantage the relative position of the different parts of the locking device in locked position, the dotted lines showing the position of one of the parts when unlocked. Fig. 2 is a sectional view of the nut, taken on the line A B of Fig. 3. Fig. 3 is a plan view of the nut. Fig. 4 is a plan view of the threaded end of the bolt with the nut locked on the same. Fig. 5 is a side view of the casing in which the locking device is secured and showing the locking device in dot, and Fig. 6 is a plan view of the casing with the locking device removed.

Similar numerals refer to similar parts throughout the several views.

1 is the bolt.

2 is the nut.

3 represents recesses in the threads at the top of the nut, into which locking-detent 4 meshes.

4 is a locking-detent designed to fit in recesses 3.

5 is a lever fulcrumed at 6 and operating locking-detent 4 back and forth into a locked and unlocked position by means of pin 7 engaging in slot 8 in locking-detent 4.

9 is a casing in which is secured and in which operates the locking mechanism and which is held in the end of the bolt by means of projections 10 and 11, the ends with projections 11 being curved, as shown in dot, for putting into position, after which they are straightened out, as shown in full lines.

12 is a key passing through casing 9 and lever 5 at openings 13 and 15, thus securing lever 5 and locking-detent 4 when in locked position. Key 12 is countersunk in groove 14 in the end of bolt 1 in order that the top of lever 5 may be flush with the end of said bolt.

16 is a recess in the end of bolt 1 for receiving casing 9 and the locking mechanism connected therewith.

The range of movement of the nut on the bolt while in position to be locked depends upon the depth of recesses 3.

The operation of putting the nut on the bolt and locking the same is as follows: Lever 5 is raised, as shown in dot in Fig. 1, which forces locking-detent 4 out of the path of the threads on nut 2. The nut is then put on in the ordinary way and screwed down until recesses 3 are opposite locking-detent 4, when lever 5 is depressed, thereby forcing said locking-detent into some one of recesses 3, thus obstructing the path of the threads on the nut and securely locking the same on the bolt. Key 12 is then inserted at opening 13 in casing 9 and through lever 5 at opening 15, thus securely locking said lever and locking-detent 4.

What I claim as my invention, and desire to secure by Letters Patent, is—

1. In the end of a bolt, a recess 16 in which may be inserted casing 9, casing 9 secured in said recess, lever 5 fulcrumed in said casing, and locking-detent 4 operated by lever 5, in combination with said bolt.

2. In the end of a bolt, recess 16 in which may be inserted casing 9, casing 9 secured in said recess, lever 5 fulcrumed in said casing, locking-detent 4 operated by lever 5, and key 12 securing lever 5 when locking-detent 4 is in locked position, in combination with said bolt.

LAWRENCE BATTLE GRAY.

Witnesses:
FRANK B. STEVENS,
H. W. BRUNK.